United States Patent [19]
Buell

[11] Patent Number: 4,940,277
[45] Date of Patent: Jul. 10, 1990

[54] MOTORHOME

[76] Inventor: V. Donald Buell, 15930 Nisqually Rd.—4B, Victorville, Calif. 92392

[21] Appl. No.: 348,890

[22] Filed: May 8, 1989

[51] Int. Cl.$^5$ .............................................. B60R 1/10
[52] U.S. Cl. .................................. 296/164; 296/170; 296/24.1; 296/69; 5/118
[58] Field of Search ................... 296/164, 24.1, 65.1, 296/170, 69, 156; 5/118

[56] References Cited

U.S. PATENT DOCUMENTS

| | | | |
|---|---|---|---|
| 2,297,176 | 9/1942 | Thompson | 296/69 |
| 3,006,001 | 10/1961 | Llewellyn | 296/156 |
| 3,058,769 | 10/1962 | Wilson | 296/156 |
| 3,097,881 | 7/1963 | Aguilar | 296/69 |
| 3,567,272 | 3/1971 | Low | 296/156 |
| 3,675,965 | 7/1972 | Burdett | 296/156 |
| 3,722,011 | 3/1973 | Miller | 296/164 |
| 3,880,458 | 4/1975 | Jackson | 296/164 |
| 4,186,960 | 2/1980 | Mizelle | 296/69 |
| 4,343,508 | 8/1982 | Heling et al. | 296/69 |
| 4,458,939 | 7/1984 | Höhn | 296/164 |
| 4,605,258 | 8/1986 | Höhn | 296/164 |
| 4,685,719 | 8/1987 | Hanemaayer | 296/164 |
| 4,746,164 | 5/1988 | Crean | 296/164 |

OTHER PUBLICATIONS

"Bounder Adventures" brochure; Fleetwood Enterprises, Inc., Riverside California; pp. 1, 24–32; Jan., 1989.

Primary Examiner—Robert R. Song
Attorney, Agent, or Firm—Sheldon & Mak

[57] ABSTRACT

An improved motorhome in which the features normally requiring a large driving and housing space are achieved in a compact area by utilizing a pair of transversely positionable trundles each carrying a fixed cushion portion and a longitudinally movable, track-carried cushion member each such cushion member comprising a pair of cushions selectively rotatably about a common axis from a horizontal position, when a bed function is being performed, to a vertical or semi-vertical position, when a driver's or passenger's seat function, or a lounging function, is being performed, servo-mechanical means being provided to move and lock each cushion member in the appropriate longitudinal position and the rotatable cushions in the desired elevational position.

20 Claims, 2 Drawing Sheets

MOTORHOME

BACKGROUND OF THE INVENTION

1. Field of the Invention

This invention relates to motorhomes and, more particularly, to motorhomes with maximum utility and comfort in minimum space.

2. Prior Art

Americans' propensity for seeing their country and getting back to nature may best be exemplified by the popularity of motorhomes. Motorhomes come in many sizes and shapes. Buses are used as motorhomes after the seats are removed and replaced by home-like components. The motor vehicle industry produces various truck-like chassis on which various manufacturers build bus-like enclosures containing close simulations of home living components. Motorhomes are powered by a variety of engines in the front, the rear or midway in the chassis. Various fuels are utilized to operate the engines.

The occupants of a motorhome want all of the comforts of home, but not the bulk that having such comforts normally entails, because that bulk, or size, makes driving and parking the motorhome difficult.

Therefore, it is an object of this invention to provide an improved motorhome in which the recited disadvantages of prior art motorhomes are overcome.

It is a further object of this invention to provide a motorhome in which the driving, lounging and sleeping functions can be handled in one relatively small area, without the loss of creature comforts whereby the size and weight of the motorhome can be reduced substantially, fuel can be conserved, traffic congestion can be ameliorated and the cost of the motorhome can be reduced.

SUMMARY OF THE INVENTION

This invention meets the foregoing objective by combining the driving, lounging, sleeping, and dinette functions in one relatively small area, called herein a "living module". Traditional motorhomes have followed the pattern common to homes: one sleeps here, dines there, and watched TV in the family room. By combining these functions the size and weight of a home-on-wheels can be reduced substantially, fuel can be conserved, traffic congestion can be ameliorated, the cost of motorhomes can be reduced, and all of this while maintaining a high level of creature comfort. It should be noted also that this combining of functions would be advantageous in any craft used from time-to-time as a home-away-from-home, whether built for land, sea, or air.

More specifically, by providing a pair of "trundles" which are selectively movable transversely to the motorhome axis into either a position with the trundles contiguous with the respective walls of the motorhome, or contiguous with each other, the sleeping accommodation can be converted from a pair of spaced twin beds to a queen-sized bed with walk-around space.

To provide driver and passenger seats, the front approximately one third of each trundle is made up of a split, foldable cushion member carried on lengthwise tracks. By means of a servo-mechanical device common to fine automobiles, this split, foldable cushion member can be, by the touch of a button, moved forward or backward, and the rear section of each split, foldable cushion member can be folded upright and held in any desired position to form a conventional car seat.

For lounging, the front portion of each split, foldable cushion member is folded upwardly to a comfortable position, the rear portion is lowered to a horizontal position, and the complete split, foldable cushion member is moved rearwardly along the lengthwise tracks until the respective cushion member is contiguous with its associated fixed cushion member, which is secured to the upper surface of the associated trundle.

Provision is made for a movable table, common to recreational vehicles, to be placed between the trundles, when in the "twin-bed" configuration, to create a dinette that will accommodate four or more individuals.

By this invention all of the advantages of a 34 foot motorhome can be realized in a 20 foot motorhome.

BRIEF DESCRIPTION OF THE DRAWINGS

My invention and wherein it constitutes a patentable advance in the motorhome art can best be understood by referring to the description which follows, taken in conjunction with the drawings herein, in which.

DETAILED DESCRIPTION OF THE PREFERRED EMBODIMENT

Figure 1:
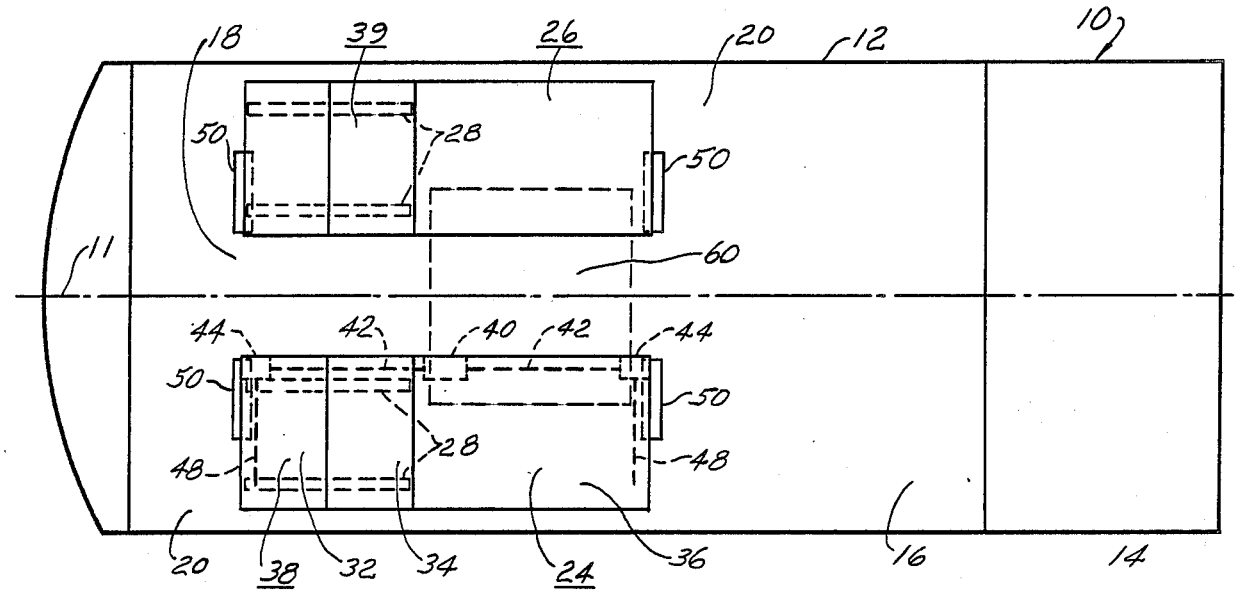
FIG. 1 is a mechanical schematic elevation view of a motorhome utilizing my invention.

In FIG. 1, motorhome 10 having a longitudinal axis 11 also has an outer shell 12 enclosing, for example, a bathroom area 14, a kitchen area 16 and a convertible driving-lounging-sleeping-dinette area 18 over a level floor 20 which extends rearwardly approximately 10 feet from the inside-front of the motorhome. The trundles 24 and 26 are secured to the floor, but are allowed to move a limited distance by mechanism 50 illustrated in FIG. 4. The split, foldable cushion members 38, 39 (the front approximately one third of each trundle) are secured to their respective trundles, but are allowed to move forward and backward along tracks 28. The necessary force to move trundles 24, 26 and move and fold the split, foldable cushion members 38, 39 is supplied by a plurality of servo-mechanical devices illustrated, schematically, in FIG. 3. Thus the trundles may be positioned contiguous with each other to form a "queen-sized" bed or contiguous with the walls to form twin beds.

Figure 2:
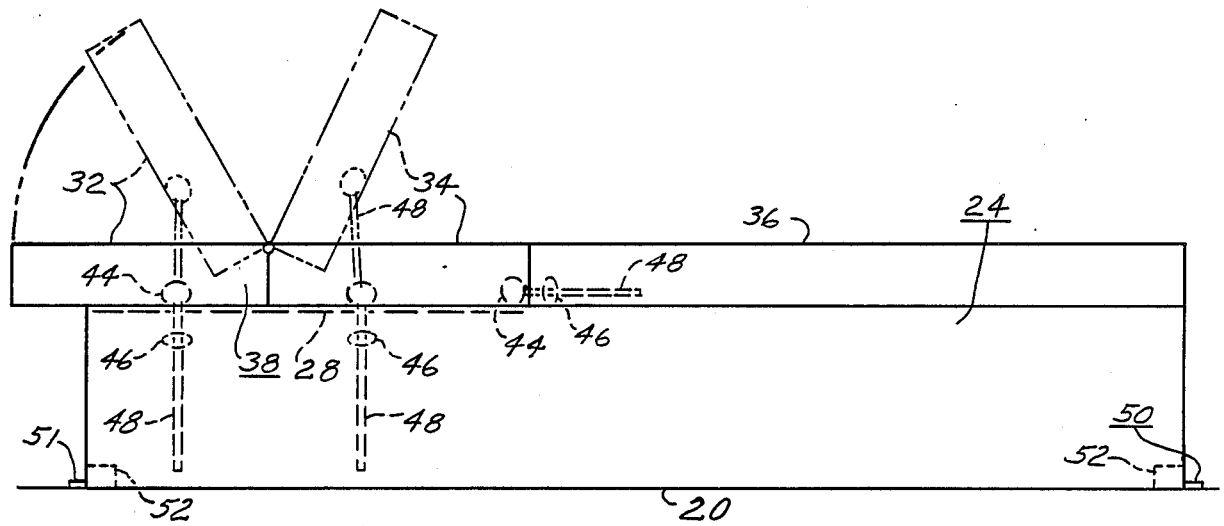
FIG. 2 is a mechanical schematic elevation view of a representative trundle.

In FIG. 2, a trundle is illustrated in greater detail. As can be seen, each split, foldable cushion member 38, 39 is made up of a pair of cushions capable of being folded upwardly, independently.

With forward cushion 32 in the horizontal position and rearward cushion 34 folded upwardly to a comfortable angle, a driver's seat is created. Conversely, with cushion 34 in a horizontal position and cushion 32 folded upwardly to a comfortable angle, a "lounge chair" is created. With both cushions in the horizontal position, and the split, foldable cushion member 38 moved rearwardly until it is contiguous with the larger fixed cushion 36, a twin bed is created.

For dining or card playing the trundles are positioned contiguous with the walls and a table 60 is installed temporarily, as shown in dotted lines in FIG. 1.

Figure 3:
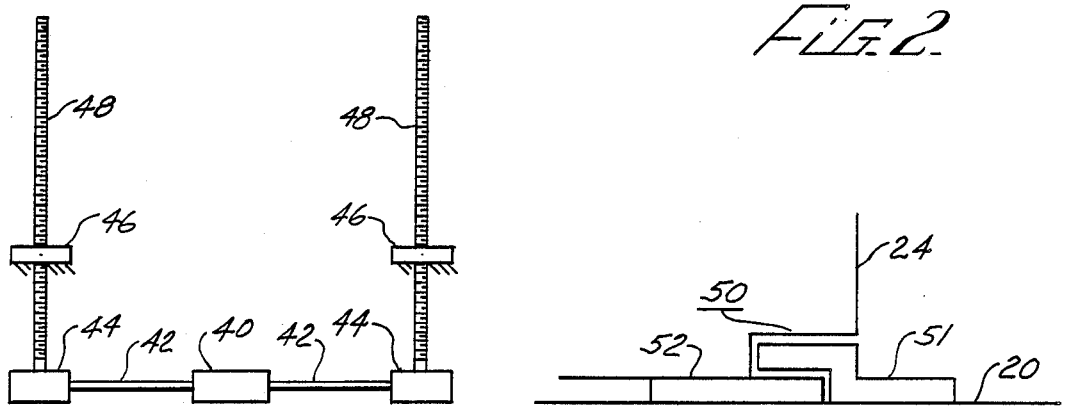
FIG. 3 is a mechanical schematic diagram of a servomechanical device usable in connection with the movable portions of the structures of FIGS. 1 and 2.

In FIG. 3 a servo-mechanical device common to the mechanism for locating and locking the trundles and cushion members is illustrated. A 12-volt reversible motor 40 transmits power through twin flexible shafts 42 to twin worm and wheel assemblies 44 which turn twin threaded shafts 48, which, in turn, push or pull against twin fixed members 46. These fixed members 46 are anchored to the respective trundle 24 or 26, in the case of the cushion members 38, 39 or to motorhome floor 20, in the case of trundles 24, 26 themselves. The load carrying capacity of each servomechanism may vary according to the requirements of the particular function. The position of the four servomechanical devices required to make trundle 24 operational is shown in dotted lines in FIG. 1. The servo-mechanical devices for positioning cushions 32 and 34 are shown in dotted lines in FIG. 2.

Figure 4:
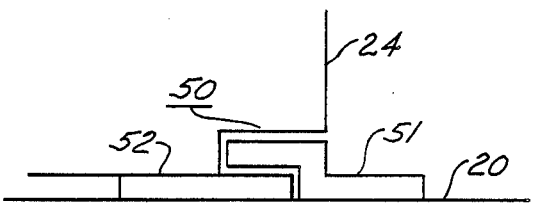
FIG. 4 is an enlarged view of a securing device for use in guiding the movement of the trundle of FIG. 2.

In FIG. 4 the securing and guiding mechanism 50 is illustrated. Each of the trundles 24, 26 is designed to move transversely about 12 inches. The Z-shaped metal fasteners 51 are bolted to the floor 20 allowing the trundles to be moved transversely on slip plates 52. The Z-shaped metal fasteners 51 also restrain the trundles longitudinally and vertically.

Figure 5:
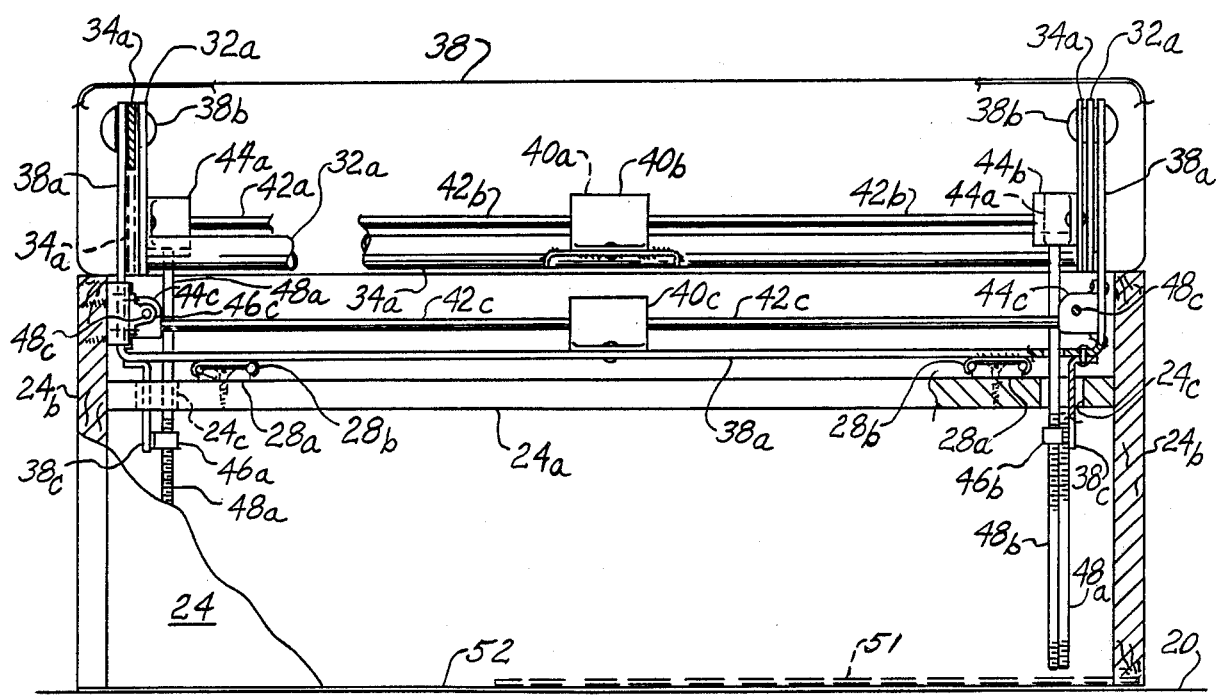
FIG. 5 is a fragmentary sectional elevational view of the structure of FIG. 2.

FIG. 5 shows details of the tracks 28 and the foldable cushion member 38. Each of the tracks 28 includes a stationary portion 28a and a movable portion 28b, the stationary portion 28a extending horizontally under the cushion member 38, being mounted to a shelf member 24a of the trundle 24. Each of the movable portions 28b is mounted to a cushion frame 38a that extends upwardly within the cushion member 38, having a cushion pin 38b mounted thereon for pivotally supporting one corner of the forward cushion 32 and the rearward cushion 34. More particularly, each pin 38a pivotally connects a forward frame 32a of the forward cushion 32 and a rearward frame 34a of the rearward cushion 43.

On each side of the cushion member 38, one of the fixed members 46 of the servo-mechanical devices is mounted to a downwardly extending portion 38c of the cushion frame 38a under each of the forward cushion 32 and the rearward cushion 34. In FIG. 5, the fixed members under the forward cushion 32 are designated 46a, while those for the rearward cushion 34 are designated 46b, only one of each being shown for clarity. Worm and wheel assemblies 44a and 44b are mounted, respectively, to each of the forward frame 32a and the rearward frame 34a for independently raising each of the cushions 32 and 34 as described above, the assemblies 44a being driven by shafts 32a from motor 40a and the assemblies 44b being driven by shafts 32b from motor 40b, the motors 40a and 40b being mounted, correspondingly, to the forward frame 32a and the rearward frame 34a. Slots 24c are formed in the shelf member 24b, providing clearance for threaded shafts 48a that extend between the worm and wheel assemblies 44a and the members 46a, and for shafts 48b that connect the assemblies 44b to the fixed members 46b.

Further, worm and wheel assemblies 44c of another of the servo-mechanisms are connected to opposite sides of the cushion frame 38a, being driven by shafts 42c from motor 40c, the motor 40c being also mounted to the cushion frame 38. A pair of fixed members 46c, being engaged by respective threaded shafts 48c, are mounted to side members 24b of the trundle 24 for longitudinal movement of the cushion member 38 as described above.

The foregoing represents my preferred embodiment, but it will be apparent to those skilled in the art that modifications and verifications may be made therein without departing from the spirit and scope of my invention.

I claim:

1. An improved motorhome comprising:
   (a) a housing having a longitudinal housing axis and a living compartment, the housing forming a floor for the compartment;
   (b) a bed structure having a longitudinal bed axis and a main, horizontally disposed cushion carried thereon;
   (c) means for supporting the bed structure in the compartment with the bed axis in a first position parallel to the housing axis;
   (d) means for laterally moving the bed structure from the first position to a second position;
   (e) a forward cushion;
   (f) a rearward cushion;
   (g) means for supporting the rearward cushion in a first position horizontally oriented adjacent to the main cushion and aligned therewith along the bed axis;
   (h) means for supporting the forward cushion in a first position horizontally oriented adjacent to the rearward cushion and aligned therewith along the bed axis;
   (i) means for supporting at least one of the forward cushion and rearward cushion in an inclined position for forming a back-supporting cushion.

2. The apparatus of claim 1, wherein the floor is substantially level.

3. The apparatus of claim 2, wherein the means for moving the bed structure from the first position to the second position comprises a pair of Z-shaped metal fasteners transversely secured to the floor in parallel relationship to each other, and a pair of trundle slides mounted to the bed structure and engaging the Z-shaped metal fasteners for guiding the bed structure in a fixed longitudinal position.

4. The apparatus of claim 1, further including means for locking the bed structure in a selected lateral position.

5. The apparatus of claim 4, wherein the means for locking the bed structure in the selected lateral position comprises servo-mechanical means carried by the bed structure and connected to the floor.

6. The apparatus of claim 4, wherein the first position of the bed structure is proximate a side wall of the compartment, the second position being spaced from the side wall.

7. The apparatus of claim 4, wherein the bed structure is a first bed structure, and the second position of the first bed structure is adjacent a second bed structure for forming an enlarged bed.

8. The apparatus of claim 7, wherein the second bed structure is laterally movable between a first position separated from the first bed structure in its second position and a second position adjacent the first bed structure in its second position.

9. The apparatus of claim 8, further comprising a table structure removably mountable between the bed structures in the first positions thereof.

10. The apparatus of claim 1, further including means for locking the forward cushion in a selected longitudinal position relative to the main cushion.

11. The apparatus of claim 10, wherein the means for locking the forward cushion in a selected longitudinal position includes:
   (a) a pair of cushion tracks mounted on the bed structure in parallel relationship to each other and to the bed axis, each cushion track carrying a track slide for movably supporting the forward cushion; and
   (b) servo-mechanical means for selective positioning of the track slides along the cushion tracks.

12. The apparatus of claim 11, wherein the servomechanical means comprises a motor-driven shaft rotatably mounted from the track slide, the shaft threadingly engaging a nut member, the nut member being mounted at a fixed location on the bed structure.

13. The apparatus of claim 10, wherein the forward cushion is movable to a second horizontally oriented position, the second position being spaced forwardly of the first position of the forward cushion for supporting a driver of the motorhome.

14. The apparatus of claim 1, further including means for locking the forward cushion and the rearward cushion in selected elevational positions.

15. The apparatus of claim 14, wherein the forward cushion in its first position and the rearward cushion in an elevated position together form a forwardly facing seat.

16. The apparatus of claim 14, wherein the forward cushion in an elevated position, the rearward cushion in its first position, and the main cushion, together form a rearwardly facing lounge.

17. The apparatus of claim 1, further including Z-shaped metal fasteners secured to the floor in parallel relationship to each other and in perpendicular relationship to the longitudinal vehicle axis, the bed structure having trundle slides which engage the Z-shaped metal fasteners for selective movement of the bed structure therealong.

18. The apparatus of claim 17, wherein the trundle slides include position-locking means.

19. The apparatus of claim 1, wherein the forward cushion and the rearward cushion form a foldable cushion member.

20. An improved motorhome comprising:
   (a) a housing having a longitudinal housing axis and a living compartment, the housing forming a floor for the compartment;
   (b) a first bed structure having a longitudinal bed axis and a main, horizontally disposed cushion carried thereon;
   (c) means for supporting the first bed structure in the compartment with the bed axis in a first position parallel to the housing axis;
   (d) means for laterally moving the first bed structure from the first position to a second position adjacent a second bed structure for forming an enlarged bed, the second bed structure being laterally movable between a first position separated from the first bed structure in its second position and a second position adjacent the first bed structure in its second position;
   (e) a forward cushion;
   (f) a rearward cushion;
   (g) means for supporting the rearward cushion in a first position horizontally oriented adjacent to the main cushion and aligned therewith along the bed axis;
   (h) means for supporting the forward cushion in a first position horizontally oriented adjacent to the rearward cushion and aligned therewith along the bed axis;
   (i) means for locking the forward cushion in a selected longitudinal position relative to the main cushion, including:
      (i) a pair of cushion tracks mounted on the bed structure in parallel relationship to each other and to the bed axis, each cushion track carrying a track slide for movably supporting the forward cushion; and
      (ii) servo-mechanical means for selective positioning of the track slides along the cushion tracks, whereby the forward cushion is movable to a second horizontally oriented position, the second position being spaced forwardly of the first position of the forward cushion for supporting a driver of the motorhome;
   (j) means for locking the forward cushion and the rearward cushion in selected elevational positions, the forward cushion in its first position and the rearward cushion in an elevated position together forming a forwardly facing seat, and the forward cushion in an elevated position, the rearward cushion in its first position and the main cushion, together forming a rearwardly facing lounge.

* * * * *

UNITED STATES PATENT AND TRADEMARK OFFICE
CERTIFICATE OF CORRECTION

PATENT NO. : 4,940,277
DATED : July 10, 1990
INVENTOR(S) : V. Donald Buell

It is certified that error appears in the above-identified patent and that said Letters Patent is hereby corrected as shown below:

```
Column 3, line 38, "32a" should be --32b--;
         line 40, "43" should be --34--;
         line 53, "32a" should be --42a--;
         line 54, "32b" should be --42b--;
         line 57, "24b" should be --24a--;
         line 66, "38" should be --38a--.

Column 4, line 5, "verifications" should be --variations--.
```

Signed and Sealed this

First Day of October, 1991

Attest:

HARRY F. MANBECK, JR.

*Attesting Officer*  *Commissioner of Patents and Trademarks*